US011336838B2

(12) United States Patent
Sasaki (10) Patent No.: US 11,336,838 B2
(45) Date of Patent: May 17, 2022

(54) IMAGE PROCESSING APPARATUS AND MEDICAL OBSERVATION SYSTEM

(71) Applicant: Sony Olympus Medical Solutions Inc., Tokyo (JP)

(72) Inventor: Toshiyuki Sasaki, Tokyo (JP)

(73) Assignee: SONY OLYMPUS MEDICAL SOLUTIONS INC., Tokyo (JP)

( * ) Notice: Subject to any disclaimer, the term of this patent is extended or adjusted under 35 U.S.C. 154(b) by 0 days.

(21) Appl. No.: 16/802,600

(22) Filed: Feb. 27, 2020

(65) Prior Publication Data

US 2020/0304722 A1 Sep. 24, 2020

(30) Foreign Application Priority Data

Mar. 22, 2019 (JP) .............................. JP2019-055736

(51) Int. Cl.
*H04N 7/18* (2006.01)
*H04N 5/243* (2006.01)
*G02B 21/36* (2006.01)
*G02B 21/00* (2006.01)
*H04N 5/235* (2006.01)

(52) U.S. Cl.
CPC ......... *H04N 5/243* (2013.01); *G02B 21/0012* (2013.01); *G02B 21/365* (2013.01); *H04N 5/2351* (2013.01)

(58) Field of Classification Search
CPC .. H04N 5/243; H04N 5/2351; G02B 21/0012; G02B 21/365

USPC ................... 348/68, 77; 351/243; 250/208.1
See application file for complete search history.

(56) References Cited

U.S. PATENT DOCUMENTS

| 9,424,804 | B2* | 8/2016 | Jung | G09G 3/20 |
| 2008/0204662 | A1* | 8/2008 | Kanazawa | A61B 3/032 |
| | | | | 351/243 |
| 2014/0014820 | A1* | 1/2014 | Yabe | H04N 5/376 |
| | | | | 250/208.1 |
| 2017/0095297 | A1* | 4/2017 | Richmond | A61B 90/30 |
| 2018/0344129 | A1* | 12/2018 | Shiraishi | A61B 1/00009 |

FOREIGN PATENT DOCUMENTS

JP 2012-147221 A 8/2012

* cited by examiner

*Primary Examiner* — Jayanti K Patel
*Assistant Examiner* — Richard B Carter
(74) *Attorney, Agent, or Firm* — Xsensus, LLP (57) ABSTRACT

An image processing apparatus includes circuitry configured to: set a luminance adjustment mode to one of a first luminance adjustment mode that performs luminance adjustment with preset sensitivity and a second luminance adjustment mode that has sensitivity of the luminance adjustment lower than the sensitivity of the first luminance adjustment mode and suppresses luminance of a high luminance region based on an observation state of an imager configured to capture a target; and perform the luminance adjustment in the set luminance adjustment mode.

11 Claims, 8 Drawing Sheets

FIG.10

IMAGE PROCESSING APPARATUS AND MEDICAL OBSERVATION SYSTEM

This application claims priority from Japanese Application No. 2019-055736, filed on Mar. 22, 2019, the contents of which are incorporated by reference herein in its entirety.

BACKGROUND

The present disclosure relates to an image processing apparatus and a medical observation system.

As a medical observation system for observing a micro portion while performing a surgery on the micro portion in a brain, a heart, or the like of a patient who is an object to be observed, there has been known an optical microscopic system which includes a support portion that has a plurality of arm portions and realizes a motion of a total of six-degree of freedom of a translational three-degree of freedom and a rotational three-degree of freedom and a microscopic unit that is provided at a distal end of the support portion and includes an enlargement optical system enlarging the micro portion or an imaging device.

In the electronic imaging medical observation system, brightness of a surgical site, which is an object to be observed, frequently changes during surgery, so it is necessary to control luminance according to an observation image. Therefore, in the medical observation system, the luminance of the observation image is measured and controlled to be appropriate (see, for example, JP 2012-147221 A).

JP 2012-147221 A discloses that with respect to a set surgical field area, luminance of a region in which luminance is high is reduced outside the surgical field area. JP 2012-147221 A discloses that a high luminance region is extracted outside the surgical field area, and luminance of the extracted region is reduced.

SUMMARY

If the medical observation system including the microscopic unit is controlled as in JP 2012-147221 A, because the entire captured area (the entire image) corresponds to the surgical field area, there is no outside of the surgical field area, and therefore the high luminance region cannot be reduced. In addition, when the surgical field area is determined according to the setting, luminance cannot be adjusted and contrast is large even if a surgeon's hand or a surgical instrument having a large difference in luminance from object to be observed is imaged in the surgical field area, and therefore an image is unsuitable for observation luminance.

There is a need for an image processing apparatus and a medical observation system capable of flexibly adjusting luminance with respect to a high luminance region in an image.

According to one aspect of the present disclosure, there is provided an image processing apparatus including circuitry configured to: set a luminance adjustment mode to one of a first luminance adjustment mode that performs luminance adjustment with preset sensitivity and a second luminance adjustment mode that has sensitivity of the luminance adjustment lower than the sensitivity of the first luminance adjustment mode and suppresses luminance of a high luminance region based on an observation state of an imager configured to capture a target; and perform the luminance adjustment in the set luminance adjustment mode.

DETAILED DESCRIPTION

Hereinafter, a mode (hereinafter referred to as "embodiment") for carrying out the present disclosure will be described with reference to the accompanying drawings. Note that drawings are merely schematic, and there are cases in which portions having different dimensional relationships and ratios are included between the drawings.

Embodiment

Figure 1:
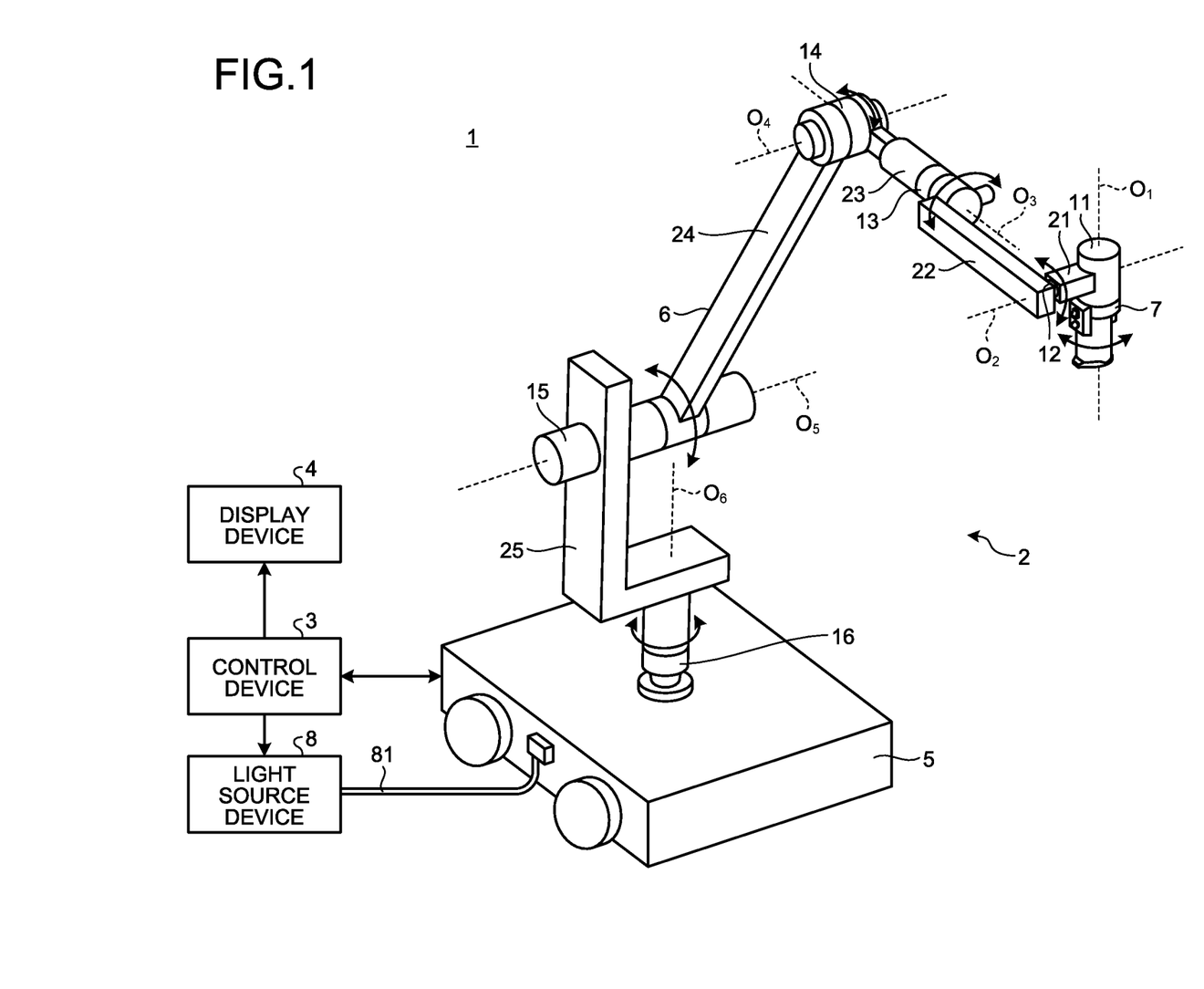
FIG. 1 is a perspective view illustrating an external configuration of a medical observation system according to an embodiment.

FIG. 1 is a view illustrating a configuration of a medical observation system according to an embodiment. A medical observation system 1 illustrated in FIG. 1 includes a medical observation device (hereinafter, referred to as an observation device) 2 having a function as a microscope that enlarges and captures a fine structure of an object to be observed, a control device 3 that integrally controls an operation of the medical observation system 1, and a display device 4 that displays an image captured by an observation device 2.

The observation device 2 includes a base portion 5 that is movable on a floor surface, a support portion 6 that is supported by the base portion 5, and a columnar-shaped microscopic unit 7 that is provided at a distal end of the support portion 6 to enlarge and capture a micro portion of an object to be observed. In addition, the observation device 2 is connected to a light source device 8 that supplies illumination light to the observation device 2 via a light guide 81 formed of an optical fiber or the like.

In the observation device 2, for example, a cable group that includes a transmission cable including a signal line for performing signal transmission between the control device 3 and the microscopic unit 7, a light guide cable for guiding illumination light from the light source device 8 to the microscopic unit 7, and the like is arranged from the base portion 5 to the microscopic unit 7. The cable group is arranged along the support portion 6.

The support portion 6 includes a first joint 11, a first arm portion 21, a second joint 12, a second arm portion 22, a third joint 13, a third arm portion 23, a fourth joint 14, a fourth arm portion 24, a fifth joint 15, a fifth arm portion 25, and a sixth joint 16.

The support portion 6 includes four sets, each set including two arm portions and a joint that is rotatably connected to one (distal end side) of the two arm portions to the other (proximal end side) thereof. Specifically, these four sets are (the first arm portion 21, the second joint 12, the second arm portion 22), (the second arm portion 22, the third joint 13, the third arm portion 23), (the third arm portion 23, the fourth joint 14, the fourth arm portion 24), (the fourth arm portion 24, the fifth joint 15, the fifth arm portion 25).

The first joint 11 is held by the first arm portion 21 in a state where the microscopic unit 7 is rotatably held on the distal end side and is fixed to a distal end portion of the first arm portion 21 on the proximal end side. The first joint 11 has a cylindrical shape, and holds the microscopic unit 7 so as to be rotatable around a first axis $O_1$ which is a central axis in a height direction. The first arm portion 21 has a shape extending in a direction orthogonal to the first axis $O_1$ from a side surface of the first joint 11.

The second joint 12 is held by the second arm portion 22 in a state where the first arm portion 21 is rotatably held on the distal end side and is fixed to a distal end portion of the second arm portion 22 on the proximal end side. The second joint 12 has a cylindrical shape, and holds the first arm portion 21 so as to be rotatable around a second axis $O_2$ which is a central axis in a height direction and an axis orthogonal to the first axis $O_1$. The second arm portion 22 is substantially L-shaped, and is connected to the second joint 12 at an end portion of an L-shaped longitudinal line portion.

The third joint 13 is held by the third arm portion 23 in a state where the L-shaped lateral line portion of the second arm portion 22 is rotatably held on the distal end side and is fixed to a distal end portion of the third arm portion 23 on the proximal end side. The third joint 13 has a cylindrical shape, and holds the second arm portion 22 so as to be rotatable around a third axis $O_3$ which is the central axis in the height direction, an axis orthogonal to the second axis $O_2$, and an axis parallel to a direction in which the second arm portion 22 extends. The distal end side of the third arm portion 23 has a cylindrical shape, and the proximal end side thereof is formed with a hole portion penetrating through a direction orthogonal to a height direction of a cylinder of the distal end side. The third joint 13 is rotatably held by the fourth joint 14 through the hole portion.

The fourth joint 14 is held by the fourth arm portion 24 in a state where the third arm portion 23 is rotatably held on the distal end side and is fixed to the fourth arm portion 24 on the proximal end side. The fourth joint 14 has a cylindrical shape, and holds the third arm portion 23 so as to be rotatable around a fourth axis $O_4$ which is a central axis in a height direction and an axis orthogonal to the third axis $O_3$.

The fifth joint 15 rotatably holds the fourth arm portion 24 on the distal end side and is fixedly attached to the fifth arm portion 25 on the proximal end side. The fifth joint 15 has a cylindrical shape, and holds the fourth arm portion 24 so as to be rotatable around a fifth axis $O_5$ which is a central axis in a height direction and an axis parallel to the fourth axis $O_4$. The fifth arm portion 25 includes an L-shaped portion and a rod-shaped portion extending downward from a L-shaped lateral line portion. The fifth joint 15 is attached to an end portion of the L-shaped longitudinal line portion of the fifth arm portion 25 on the proximal end side.

The sixth joint 16 rotatably holds the fifth arm portion 25 on the distal end side and is fixedly attached to an upper surface of the base portion 5 on the proximal end side. The sixth joint 16 has a cylindrical shape, and holds the fifth arm portion 25 so as to be rotatable around a sixth axis $O_6$ which is a central axis in a height direction and an axis orthogonal to the fifth axis $O_5$. A proximal end portion of the rod-shaped portion of the fifth arm portion 25 is attached to the distal end side of the sixth joint 16.

The support portion 6 having the above-described configuration realizes a total of six-degree of freedom of a translational three-degree of freedom and a rotational three-degree of freedom in the microscopic unit 7.

The first joint 11 to the sixth joint 16 have electromagnetic brakes that prohibit the microscopic unit 7 and the first arm portion 21 to the fifth arm portion 25, respectively, from rotating. Each electromagnetic brake is released in a state where an arm operation switch 73 (described later) provided in the microscopic unit 7 is pressed, and allows the microscopic unit 7 and the first arm portion 21 to the fifth arm portion 25 to rotate. Note that an air brake may be applied instead of the electromagnetic brake.

In addition to the electromagnetic brake described above, each joint may be equipped with an own encoder and an own actuator. For example, when the encoder is provided in the first joint 11, the encoder detects a rotation angle on the first axis $O_1$. The actuator is configured by an electric motor such as a servo motor, and is driven by control from the control device 3 to cause rotation at the joint by a predetermined angle. The rotation angle at the joint is, for example, a value necessary for moving the microscopic unit 7 so that an observation point does not change before and after the movement of the microscopic unit 7, and is set by the control device 3 based on the rotation angle at each rotation axis (first axis $O_1$ to sixth axis $O_6$). In this way, a joint provided with an active drive mechanism such as the actuator constitutes a rotating shaft that actively rotates by controlling the driving of the actuator.

Figure 2:
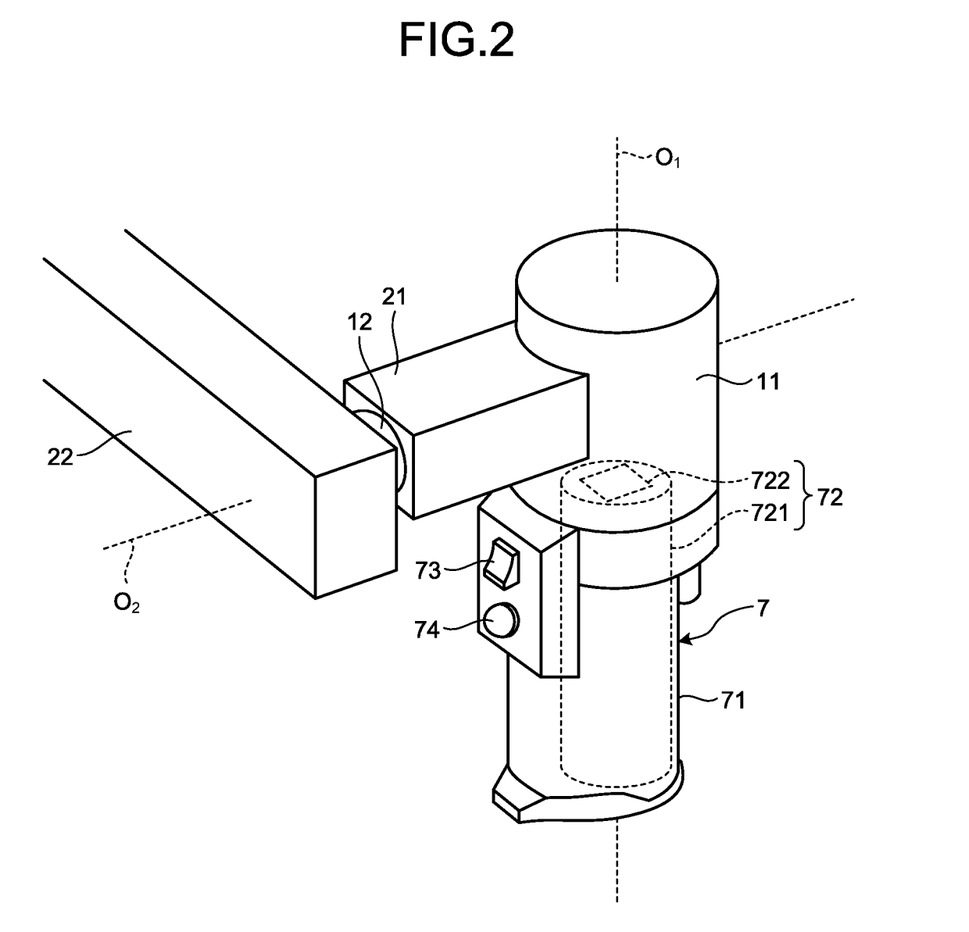
FIG. 2 is an enlarged perspective view illustrating a configuration of a microscopic unit of a medical observation device according to an embodiment and components therearound.

FIG. 2 is an enlarged perspective view illustrating the configuration of the microscopic unit 7 of the observation device 2 and components therearound. Hereinafter, the configuration of the microscopic unit 7 will be described with reference to FIG. 2.

The microscopic unit 7 includes a tubular portion 71 having a cylindrical shape, an imaging unit 72 that is provided in a hollow part of the tubular portion 71 and enlarges and captures an image of an object to be observed, an arm operation switch 73 that receives an operation input allowing a rotation of each joint by releasing the electromagnetic brakes in the first joint 11 to the sixth joint 16, and a cross lever 74 that can change an enlargement magnification in the imaging unit 72 and a focal length to an object to be observed.

Note that the microscopic unit 7 is provided with an upper cover (not illustrated) that is formed around an upper portion of the imaging unit 72 and fitted into the first joint 11, and a hollow cylindrical shaft portion (not illustrated) extending along the first axis $O_1$ from the upper cover.

The tubular portion 71 has a cylindrical shape smaller in diameter than the first joint 11, and an opening surface of a lower end portion is provided with a cover glass (not illustrated) that protects the imaging unit 72. Note that a shape of the tubular portion 71 is not limited to a cylindrical shape, and may be a cylindrical shape whose cross section orthogonal to the height direction is an ellipse or a polygon, for example.

The imaging unit 72 includes an optical system 721 that has a plurality of lenses arranged so that an optical axis coincides with the first axis $O_1$ and condenses light from an object to be observed to form an image, and an imaging device 722 that receives the light condensed by the optical system 721 and photoelectrically converts the received light to generate an imaging signal. Note that FIG. 2 illustrates only a tubular housing that houses the plurality of lenses included in the optical system 721.

The optical system 721 can change an enlargement magnification of an image of an object to be observed and a focal length to the object to be observed in accordance with an operation of the cross lever 74.

The imaging device 722 is configured using a charge coupled device (CCD) or a complementary metal oxide semiconductor (CMOS), respectively. The imaging device 722 generates an imaging signal for generating a two-dimensional image. These imaging signals are output from the imaging device 722 as digital signals. Note that two imaging devices may be provided to generate two imaging signals having parallax one another as imaging signals for generating a three-dimensional image.

The arm operation switch 73 is a push button type switch. While a user presses the arm operation switch 73, the electromagnetic brakes of the first joint 11 to the sixth joint 16 are released. The arm operation switch 73 is provided on a side surface opposite to a side surface that a user faces when the microscopic unit 7 is operated, in other words, a side surface that becomes a blind spot of the user when the microscopic unit 7 is operated. The arm operation switch 73 forms a part of an operation input unit that receives an operation input to the observation device 2.

The cross lever 74 can be operated along a height direction of the tubular portion 71 and a circumferential direction orthogonal to the height direction. The cross lever 74 is provided on a side surface below the arm operation switch 73 along the height direction of the tubular portion 71, in the side surface of the tubular portion 71. Similarly to the arm operation switch 73, the cross lever 74 also forms a part of an operation input unit that receives an operation input to the observation device 2.

When the cross lever 74 is operated along the height direction of the tubular portion 71 from the position illustrated in FIG. 2, the enlargement magnification is changed, and when the cross lever 74 is operated along the circumferential direction of the tubular portion 71 from the position illustrated in FIG. 2, the focal length to the object to be observed is changed. For example, when the cross lever 74 is moved upward along the height direction of the tubular portion 71, the enlargement magnification increases, and when the cross lever 74 is moved downward along the height direction of the tubular portion 71, the enlargement magnification decreases. In addition, when the cross lever 74 is moved clockwise along the circumferential direction of the tubular portion 71, the focal length to the object to be observed is farther, and when the cross lever 74 is moved counterclockwise along the circumferential direction of the tubular portion 71, the focal length to be observed is closer. Note that a movement direction and an operation assignment of the cross lever 74 are not limited to those described here.

The control device 3 receives the imaging signal output from the observation device 2, and generates image data for display by performing predetermined signal processing on the imaging signal. Note that the control device 3 may be installed inside the base portion 5 and integrated with the observation device 2.

Figure 3:
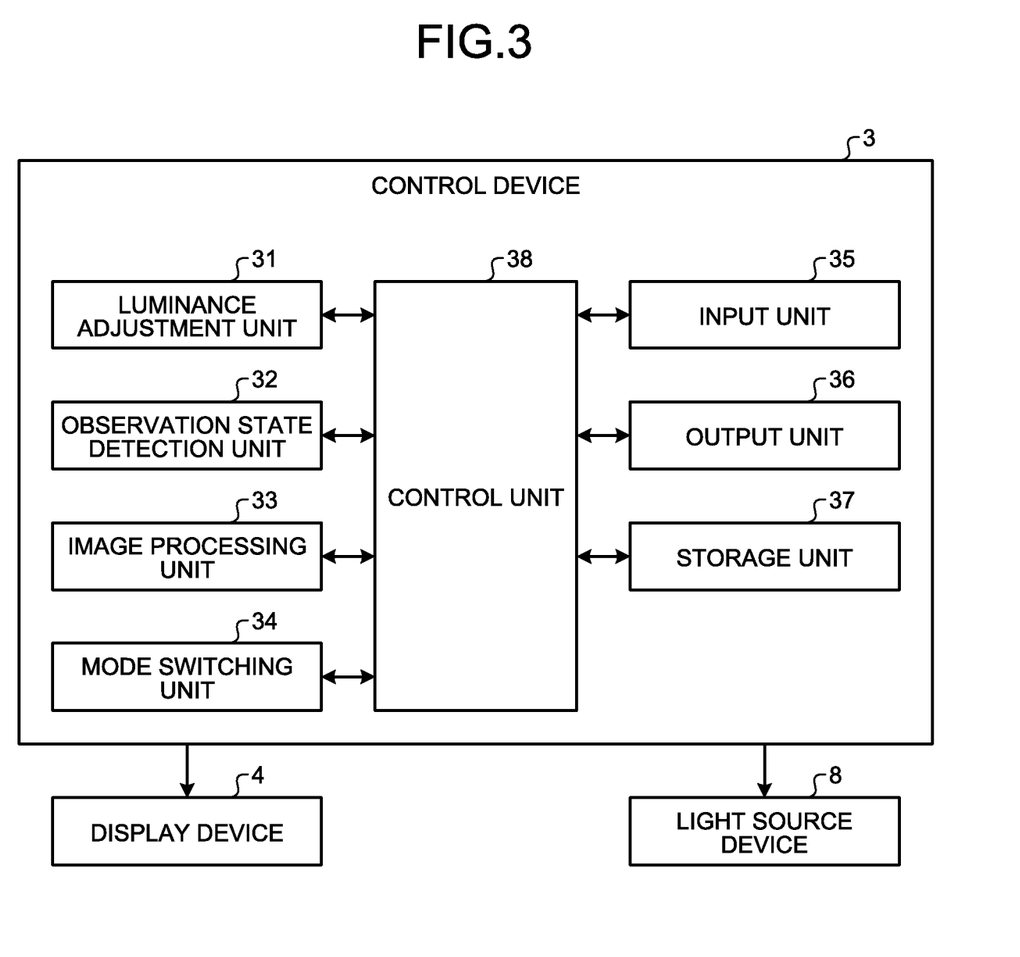
FIG. 3 is a block diagram illustrating a configuration of a control device of the medical observation system according to the embodiment.

FIG. 3 is a block diagram illustrating a configuration of the control device of the medical observation system according to the embodiment. The control device 3 includes a luminance adjustment unit 31, an observation state detection unit 32, an image processing unit 33, a mode switching unit 34, an input unit 35, an output unit 36, a storage unit 37, and a control unit 38. Note that the control device 3 may include a power supply unit (not illustrated) that generates a power supply voltage for driving the observation device 2 and the control device 3, supplies the generated power supply voltage to each portion of the control device 3, and supplies the generated power supply voltage to the observation device 2 via a transmission cable, and the like. In the embodiment, an image processing apparatus is configured using at least the luminance adjustment unit 31, the image processing unit 33, and the mode switching unit 34.

The luminance adjustment unit 31 performs luminance adjustment according to the set luminance adjustment mode. Here, the luminance is a Y value obtained by converting RGB components into luminance (Y) and color differences (Cb and Cr).

In the embodiment, either a first luminance adjustment mode that adjusts the luminance so that the luminance obtained by measuring the acquired imaging signal is appropriate, or a second luminance adjustment mode that extracts the high luminance region from the captured image based on the imaging signal by stopping the luminance adjustment by the first luminance adjustment mode and performs the luminance suppression processing of the extracted region is set.

When the luminance adjustment unit 31 is set to be in the first luminance adjustment mode, the average luminance, the highest luminance, the lowest luminance, and the like are obtained from the luminance of the entire image (each pixel), and the luminance is adjusted so that the entire image has appropriate luminance within the luminance range (sensitivity) in which these luminances are preset. In the first luminance adjustment mode, the known automatic luminance adjustment method can be employed.

Further, when the luminance adjustment unit 31 is set to be in the second luminance adjustment mode, the sensitivity of the luminance adjustment is lower than that in the first luminance adjustment mode, the high luminance region is extracted from the captured image, the luminance reduction processing is performed in the extracted region, the images in the high luminance region are synthesized after the luminance reduction processing is performed on the captured image, and the images in the high luminance region in the captured image are replaced with the images subjected to the reduction processing. In the embodiment, an example will be described in which the luminance adjustment is performed only in the high luminance region when the second luminance adjustment mode is set.

The observation state detection unit 32 detects whether the imaging position can be moved by the microscopic unit 7 or whether the imaging position is fixed by detecting whether the arm operation switch 73 is pressed and detects whether the imaging range can be changed or whether the capturing range is fixed by operating the cross lever 74. The observation state detection unit 32 outputs the detection result to the mode switching unit 34.

The image processing unit 33 performs signal processing, such as noise removal and A/D conversion as necessary, on the imaging signal output from the microscopic unit 7. The image processing unit 33 generates an imaging signal for displaying to be displayed on the display device 4 based on the imaging signal subjected to the signal processing. The image processing unit 33 performs predetermined signal processing on the imaging signal to generate an imaging signal for displaying including a subject image. Here, the image processing unit 33 performs the known image processing such as various image processing such as detection processing, interpolation processing, color correction processing, color enhancement processing, and contour enhancement processing. The image processing unit 33 outputs the generated imaging signal to the display device 4.

Further, the image processing unit 33 may include an AF processing unit that outputs a predetermined AF evaluation value for each frame based on the input imaging signal of the frame, and an AF calculation unit that performs AF calculation processing to select a frame, a focus lens position, or the like which is most suitable as a focal position from the AF evaluation values of each frame from the AF processing unit.

The mode switching unit 34 sets the luminance adjustment mode to be in one of the first luminance adjustment mode and the second luminance adjustment mode based on the detection result of the observation state detection unit 32. Specifically, when the device is started up, the mode switching unit 34 first sets the first luminance adjustment mode, and switches the luminance adjustment mode to the second luminance adjustment mode in the case where the arm operation switch 73 and the cross lever 74 are not operated and both the imaging position and imaging range are fixed. Further, when at least one of the imaging position and the imaging range can be changed when the second luminance adjustment mode is set, the luminance adjustment mode is switched to the first luminance adjustment mode.

The input unit 35 is realized using a user interface such as a keyboard, a mouse, and a touch panel, and receives an input of various types of information.

The output unit 36 is realized using a speaker, a printer, a display, or the like, and outputs various types of information.

The storage unit 37 is realized using a semiconductor memory such as a flash memory or a dynamic random access memory (DRAM), and records communication information data (for example, communication format information and the like). Note that the storage unit 37 may store various programs and the like which are executed by the control unit 38.

The control unit 38 performs drive control of each component included in the control device 3 and the observation device 2, and input/output control of information on each component. The control unit 38 generates a control signal with reference to communication information data (for example, communication format information) recorded in the storage unit 37, and transmits the generated control signal to the microscopic unit 7.

Note that the control unit 38 generates a synchronization signal and a clock for the microscopic unit 7 and the control device 3. The synchronization signal (for example, a synchronization signal and the like for instructing imaging timing) to the microscopic unit 7 or a clock (for example, a clock for serial communication) is transmitted to the microscopic unit 7 through a line (not illustrated), and the microscopic unit 7 is driven based on the synchronization signal and the clock.

The luminance adjustment unit 31, the observation state detection unit 32, the image processing unit 33, the mode switching unit 34, and the control unit 38 described above are realized using a general-purpose processor such as a central processing unit (CPU) having an internal memory (not illustrated) in which a program is recorded or a dedicated processor such as various calculation circuits and the like which execute specific functions such as an application specific integrated circuit (ASIC). Further, a field programmable gate array (FPGA: not illustrated) which is a kind of programmable integrated circuit may be used. Note that in the case of the configuration of the FPGA, a memory for storing configuration data may be provided, and the FPGA, which is a programmable integrated circuit, may be configured based on the configuration data read from the memory.

The display device 4 receives the image data generated by the control device 3 from the control device 3 and displays an image corresponding to the image data.

Such a display device 4 includes a display panel formed of a liquid crystal or organic electroluminescence (EL).

Note that in addition to the display device 4, an output device that outputs information using a speaker, a printer, or the like may be provided.

Next, an outline of surgery performed using the medical observation system 1 having the above configuration will be described. While observing the image displayed on the display device 4, a surgeon holds the microscopic unit 7 in a state where the arm operation switch of the microscopic unit 7 is pressed and moves the microscopic unit 7 to a desired position, determines the imaging field of view of the microscopic unit 7, and then removes his/her finger from the arm operation switch. As a result, the electromagnetic brake is operated in the first joint 11 to the sixth joint 16, and the imaging field of view of the microscopic unit 7 is fixed. Thereafter, a surgeon performs the adjustment, and the like of the enlargement magnification, the focal length to object to be observed, and the like. Since the display device 4 displays an image, the surgeon can grasp surgical sites three-dimensionally through the image. During the observation, the imaging processing is executed at a preset frame rate, and the captured images are sequentially displayed (moving image display) on the display device 4.

Figure 4:
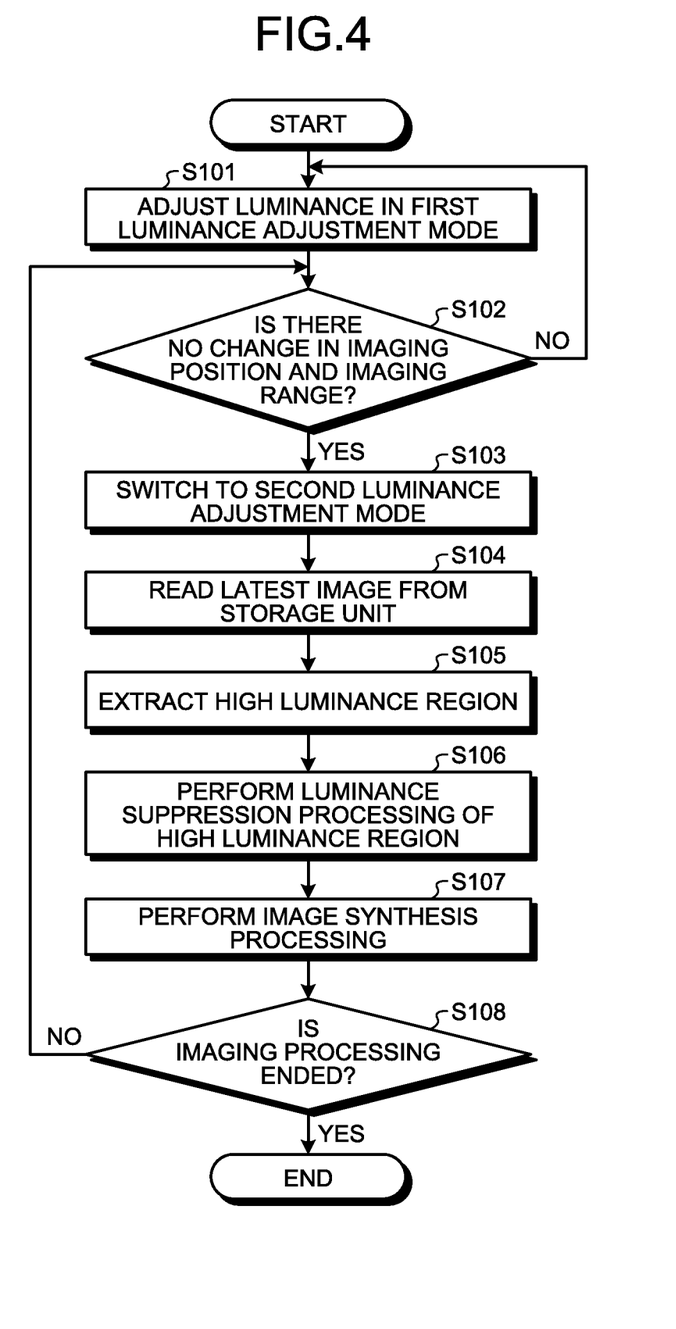
FIG. 4 is a flowchart illustrating a flow of processing performed by the control device of the medical observation system according to the embodiment.

Next, the luminance adjustment processing performed by the control device 3 will be described with reference to FIGS. 4 to 7. FIG. 4 is a flowchart illustrating a flow of processing performed by the control device of the medical observation system according to the embodiment. The flowchart illustrated in FIG. 4 illustrates an example of processing that is started after the control device 3 is started up. In addition, the imaging signals generated by the microscopic unit 7 are sequentially transmitted to the control device 3, subjected to the image processing by the image processing unit 33 of the control device 3, and then stored in the storage unit 37.

When the control device 3 is started up, the mode switching unit 34 sets the luminance adjustment mode to be in the first luminance adjustment mode, and performs the luminance adjustment processing on the sequentially acquired imaging signals (step S101).

The observation state detection unit 32 determines whether or not there is a change in the imaging position and the imaging range. The observation state detection unit 32 determines whether or not the arm operation switch 73 and the cross lever 74 are not operated, and both the imaging position and the imaging range are fixed (no change). When at least one of the state in which the imaging position by the microscopic unit 7 can be moved by pressing the arm operation switch 73 and the state in which the imaging range can be changed by the operation of the cross lever 74 is satisfied, the observation state detection unit 32 determines that there is the change in the imaging position and the imaging range (step S102: No), and the process returns to step S101, and the observation state detection unit 32 performs the luminance adjustment in the first luminance adjustment mode. On the other hand, when the observation state detection unit 32 determines that there is no change in the imaging position and the imaging range (step S102: Yes), the process proceeds to step S103.

In step S103, the mode switching unit 34 switches the luminance adjustment mode to the second luminance adjustment mode. When the luminance adjustment mode is switched to the second luminance adjustment mode, the luminance adjustment unit 31 first stops the luminance adjustment processing in the first luminance adjustment mode.

In step S104 following step S103, the luminance adjustment unit 31 reads the latest image stored in the storage unit 37.

Then, the luminance adjustment unit 31 extracts the high luminance region (step S105).

Figure 5:
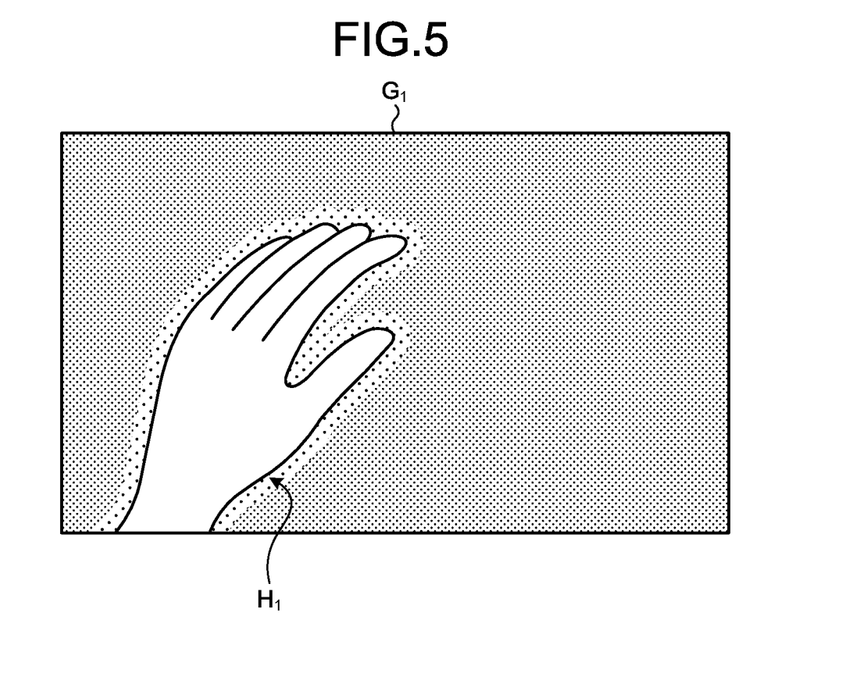
FIG. 5 is a diagram illustrating an example of an image before subjected to luminance suppression processing of a high luminance region.

FIG. 5 is a diagram illustrating an example of the image before subjected to luminance suppression processing of the high luminance region. For example, when a surgeon's hand (image H1) reflecting illumination light is imaged in a read image G1, the image H1 becomes a high-luminance image. The luminance adjustment unit 31 extracts, as the high luminance region, a minimum region including the image H1 from the image G1.

The luminance adjustment unit 31 groups a plurality of pixels constituting the image G1 into a pixel group S1 composed of, for example, 3×3 pixels, calculates luminance (representative values) for each pixel group S1, and extracts a pixel group having luminance larger than an extraction threshold value. The representative value of the pixel group is, for example, the highest value, an average value, the most frequent value, or the like. The extraction threshold value is preset and stored in the storage unit 37.

Figure 6:
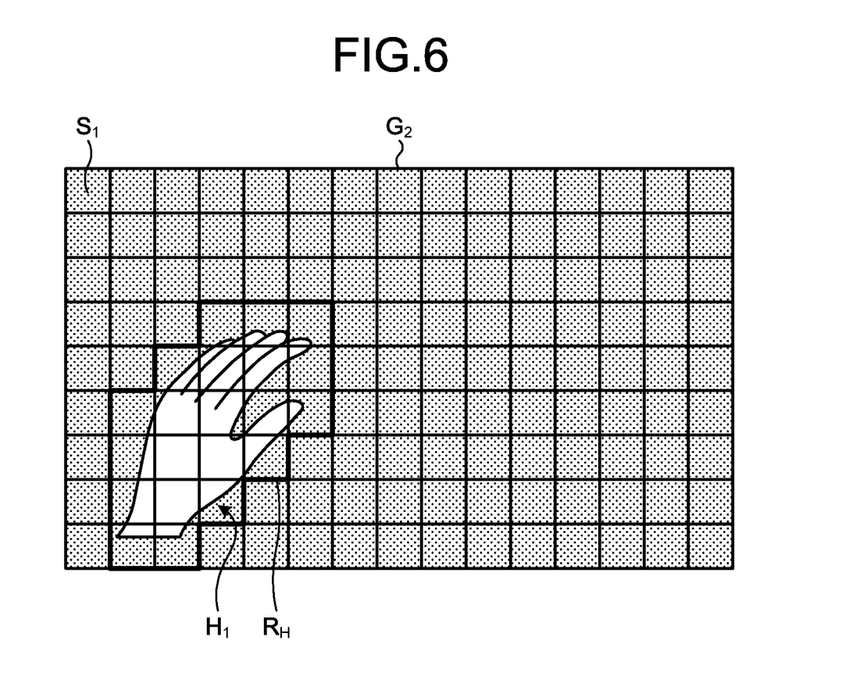
FIG. 6 is a diagram for describing extraction processing of the high luminance region.

FIG. 6 is a diagram for describing extraction processing of the high luminance region. In the example illustrated in FIG. 6, a plurality of pixel groups S1 including the image H1 are extracted. The luminance adjustment unit 31 extracts a high luminance region RH constituted by these pixel groups S1.

After extracting the high luminance region, the luminance adjustment unit 31 performs the luminance suppression processing of the high luminance region (step S106). The luminance adjustment unit 31 reduces the luminance of the high luminance region. The luminance adjustment unit 31 reduces the luminance at a preset ratio, for example. The luminance adjustment unit 31 outputs an image with reduced luminance of the high luminance region to the image processing unit 33 via the control unit 38.

Thereafter, the image processing unit 33 synthesizes the image of the high luminance region with reduced luminance with the corresponding image to generate the image with the reduced luminance of the high luminance region (step S107).

Figure 7:
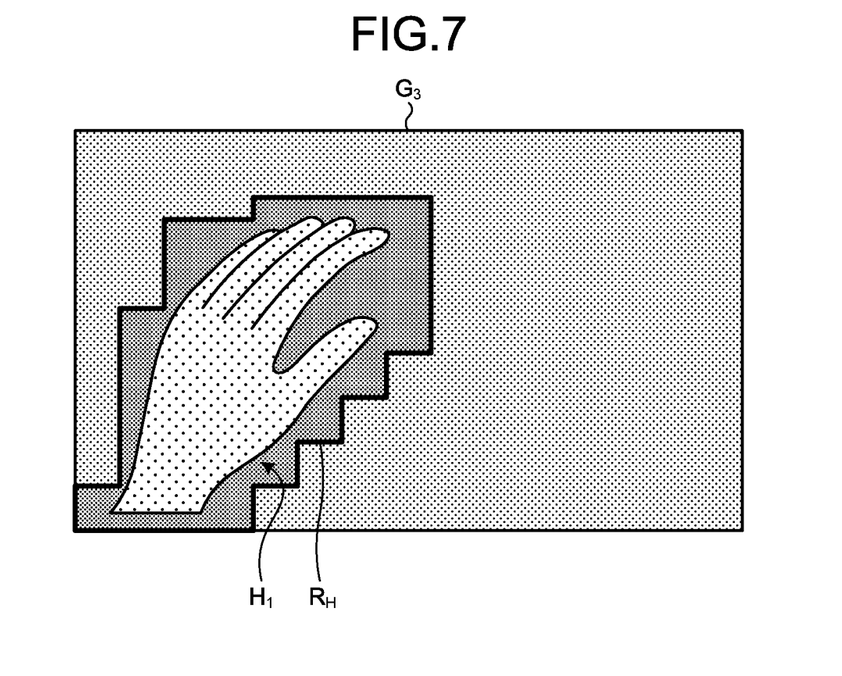
FIG. 7 is a diagram illustrating an example of an image subjected to the luminance suppression processing of the high luminance region.

FIG. 7 is a diagram illustrating an example of the image subjected to the luminance suppression processing of the high luminance region. As a result of the synthesis processing by the image processing unit 33, the image in which luminance of a high luminance region RH, such as an image G3 illustrated in FIG. 7, is reduced compared to the luminance of the image (see FIG. 5) before subjected to the luminance suppression processing of the high luminance region is obtained.

The synthesized image described above is displayed on the display device 4 and observed by a surgeon. At this time, it may be displayed on the display screen that the displayed image has been subjected to the luminance reduction process, or the output unit 36 notifies that the luminance reduction processing has been performed by sound or light.

Thereafter, the control unit 38 determines whether or not to end the imaging processing (step S108). For example, if a stop instruction of the moving image shooting is input via the input unit 35 or the moving image shooting stops (step S108: Yes), the control unit 38 ends the luminance adjustment processing. On the other hand, when the moving image shooting is continued (step S108: No), the process returns to step S102, and the control unit 38 repeats the luminance adjustment processing.

In the embodiment described above, since the high luminance region is extracted from the entire image, and the luminance of the extracted high luminance region is reduced, it is possible to reduce the luminance of the high luminance region existing in the image. According to the embodiment, the luminance adjustment can be flexibly performed on a high luminance region in an image regardless of presence or absence of a region set in the image, such as a region of interest. For example, when the region of interest is set in the image G1 (see FIG. 5) and the region of interest includes a part of an image (image H1) of a surgeon's hand, the luminance of the image H1 in the region of interest is reduced and the luminance of the high-luminance image in the region of interest is suppressed.

In addition, in the embodiment, since the high luminance region is extracted using only the luminance and the luminance reduction processing is performed, it is possible to perform calculation processing with a relatively light processing load. Thereby, when displaying an image in real time, such as a moving image display, it is possible to display a moving image while suppressing a decrease in a frame rate.

Note that in the above-described embodiment, an example is described in which the high luminance region is temporarily extracted with a first threshold, a second threshold value is set according to the temporarily extracted region, and then the high luminance region is extracted using the second threshold value, but the region extracted by the first threshold may be the high luminance region, that is, the high luminance region may be extracted only by the preset first threshold.

First Modification

Figure 8:
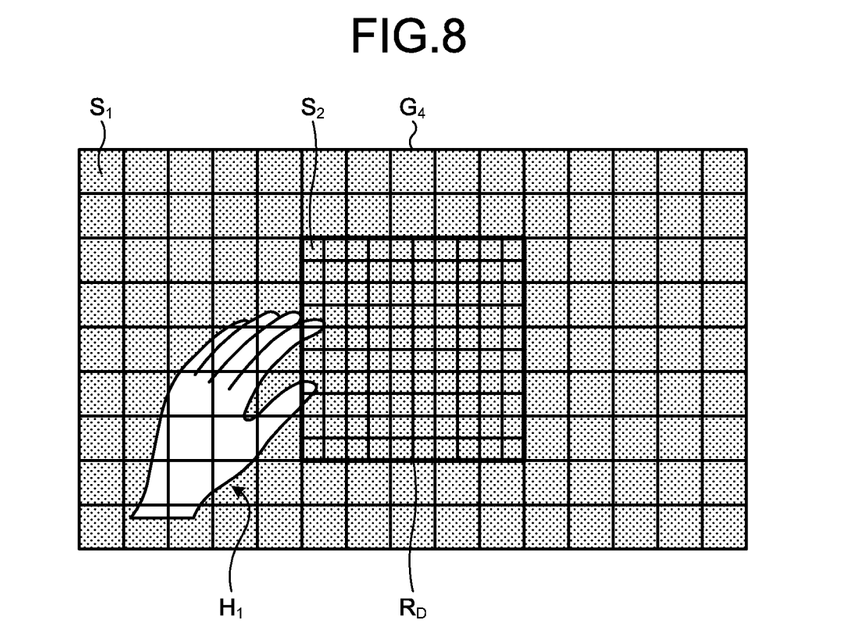
FIG. 8 is a diagram for describing the extraction processing of the high luminance region according to a first modification of the embodiment.

Next, a first modification of the embodiment will be described with reference to FIG. 8. FIG. 8 is a diagram for describing extraction processing of a high luminance region according to the first modification of the embodiment. A medical observation system according to the first modification has the same configuration as the medical observation system 1 of the above-described embodiment, and thus description thereof is omitted. Hereinafter, processing different from the embodiment will be described. Luminance adjustment processing according to the first modification is the same flow as in the embodiment (FIG. 4). In the first modification, the extraction processing of the high luminance region is different from the embodiment.

In the first modification, in the extraction processing of the high luminance region (step S105 in FIG. 4), the number of pixel configurations of a pixel group of a region RD at the center of an image G4 and a region outside the region RD is changed. Specifically, the luminance adjustment unit 31 groups pixels outside the region RD into, for example, a pixel group S1 composed of 3×3 pixels, and groups pixels in the region RD into a pixel group S2 composed of 2×2 pixels. As a result, the high luminance region is extracted in detail at the center of the image G4, and it is possible to suppress luminance of a part to be observed from being reduced.

Note that in the above-described first modification, an example has been described in which the number of pixel configurations of the pixel group between the region RD at the center of the image G4 and the region outside the region RD is changed, but when a region of interest is set, the number of configurations of the pixel group in the region of interest may be smaller than the number of configurations of the pixel group outside the region of interest. Thereby, the extraction processing of the high luminance region in the set region of interest can be performed with high accuracy.

Second Modification

Next, a second modification of the embodiment will be described with reference to FIGS. 9 and 10. A medical observation system according to the second modification has the same configuration as the medical observation system 1 of the above-described embodiment, and thus description thereof is omitted. Hereinafter, processing different from the embodiment will be described.

Figure 9:
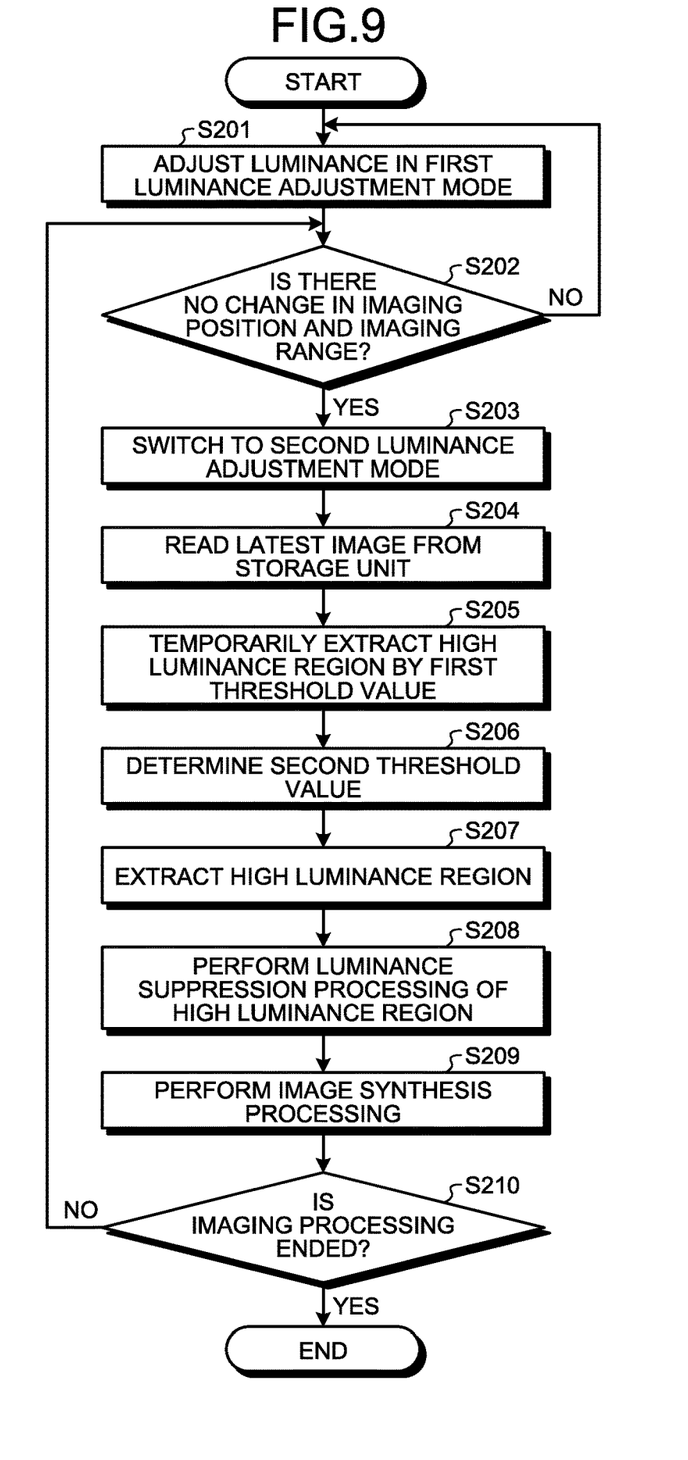
FIG. 9 is a flowchart illustrating a flow of processing performed by the control device of the medical observation system according to a second modification of the embodiment.

FIG. 9 is a flowchart illustrating a flow of processing performed by a control device of the medical observation system according to the second modification. Similar to the embodiment, the flowchart illustrated in FIG. 9 illustrates an example of processing that is started after a control device 3 is started up.

When the control device 3 is started up, a mode switching unit 34 sets a luminance adjustment mode to be in a first luminance adjustment mode, and performs luminance adjustment processing on sequentially acquired imaging signals (step S201).

As in step S102, an observation state detection unit 32 determines whether or not there is a change in an imaging position and an imaging range. When the observation state detection unit 32 determines that there is a change in the imaging position and the imaging range (step S202: No), the process returns to step S201 and the observation state detection unit 32 executes the luminance adjustment in the first luminance adjustment mode. On the other hand, when the observation state detection unit 32 determines that there is no change in the imaging position and the imaging range (step S202: Yes), the process proceeds to step S203.

In step S203, the mode switching unit 34 switches the luminance adjustment mode to a second luminance adjustment mode. When the luminance adjustment mode is switched to the second luminance adjustment mode, the luminance adjustment unit 31 first stops the luminance adjustment processing in the first luminance adjustment mode.

In step S204 following step S203, a luminance adjustment unit 31 reads the latest image stored in a storage unit 37.

Then, the luminance adjustment unit 31 extracts a high luminance region (steps S205 to S207).

The luminance adjustment unit 31 groups a plurality of pixels constituting an image G1 into a pixel group S1 composed of, for example, 3×3 pixels, calculates luminance (representative values) for each pixel group S1, and temporarily extracts a pixel group having luminance larger than a first threshold value (step S205). The representative value of the pixel group is, for example, the highest value, an average value, the most frequent value, or the like. The first threshold value is preset and stored in the storage unit 37.

Thereafter, the luminance adjustment unit 31 calculates a width (for example, the number of pixels) of a region in which the temporarily extracted pixel group occupies an image G2, and determines a second threshold value for main extraction as the high luminance region (step S206).

Figure 10:
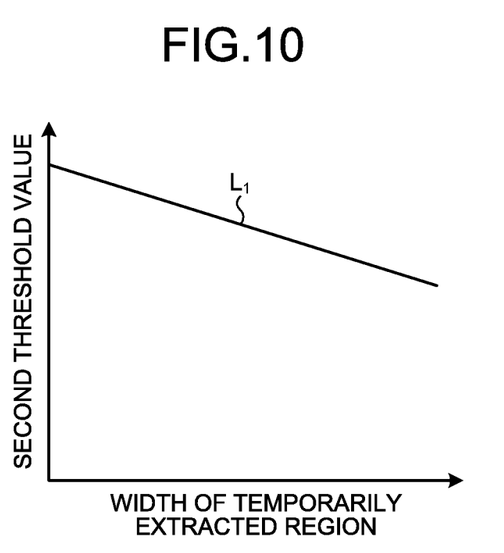
FIG. 10 is a diagram for describing a threshold value used for the extraction processing of the high luminance region in the second modification.

FIG. 10 is a diagram for describing the second threshold value used for extraction processing of the high luminance region. A graph illustrated in FIG. 10 illustrates the relationship between the region (the width of the temporarily extracted region) occupied by the temporarily extracted pixel group in the image and the second threshold value. In a straight line L1 illustrated in FIG. 10, the second threshold value decreases as the temporarily extracted region increases. The luminance adjustment unit 31 determines the second threshold value based on the width of the temporarily extracted region and the straight line L1.

Note that the first threshold value is set to be a value lower than the lowest value of the second threshold value.

The luminance adjustment unit 31 extracts a pixel group whose luminance (representative value) is larger than the second threshold value for each pixel group S1 (step S207).

After extracting the high luminance region, the luminance adjustment unit 31 performs luminance suppression processing of the high luminance region (step S208). The luminance adjustment unit 31 reduces the luminance of the high luminance region. The luminance adjustment unit 31 reduces the luminance at a preset ratio, for example. The luminance adjustment unit 31 outputs an image with reduced luminance of the high luminance region to the image processing unit 33 via the control unit 38.

Thereafter, the image processing unit 33 synthesizes the image of the high luminance region with reduced luminance with the corresponding image to generate an image with the reduced luminance in the high luminance region (step S209). The synthesized image is displayed on the display device 4 and observed by a surgeon.

Thereafter, the control unit 38 determines whether or not to end the imaging processing (step S210). For example, if a stop instruction of moving image shooting is input via an input unit 35 or the moving image shooting stops (step S210: Yes), the control unit 38 ends the luminance adjustment processing. On the other hand, when the moving image shooting is continued (step S210: No), the process returns to step S202, and the control unit 38 repeats the luminance adjustment processing.

Similar to the embodiment, in the second modification described above, since the high luminance region is extracted from the entire image, and the luminance of the extracted high luminance region is reduced, it is possible to reduce the luminance of the high luminance region existing in the image. According to the embodiment, the luminance adjustment can be flexibly performed on a high luminance region in an image regardless of presence or absence of a region set in the image, such as a region of interest.

In addition, in the second modification, since the high luminance region is temporarily extracted from the entire image, a new threshold value is set depending on a size of the temporarily extracted region, and then the high luminance region is extracted, the high luminance region whose luminance is reduced is extracted depending on the size occupied by the high luminance region in the image. Here, as the size of the high luminance region increases, the observation is prone to be hindered, and thus the threshold value (second threshold value) is set so that the region to be extracted as the high luminance is wide depending on the size of the region, and as the temporarily extracted region increases, the region in which the luminance is reduced is greatly extracted, and thus the high luminance region in which the observation is hindered can be reduced.

Note that in the second modification described above, an example has been described in which the second threshold value is determined using the graph, but the second threshold value can be determined by associating the width of the region of the temporarily extracted region with the second threshold value, for example, the second threshold value may be determined using a function, a lookup table, or the like.

Although the embodiments for carrying out the present disclosure have been described so far, the present disclosure should not be limited only to the embodiments described above. For example, the support portion 6 may have at least one set of two arm portions and a joint that rotatably connects one of the two arm portions to the other thereof.

Note that in the embodiment, an example has been described in which the luminance adjustment unit 31 stops the luminance adjustment processing according to the first luminance adjustment mode when switching to the second luminance adjustment mode has been described, but the sensitivity of the luminance adjustment in the second luminance adjustment mode may be lower than the sensitivity of the luminance adjustment in the first luminance adjustment mode, for example, the effect of the processing in the first luminance adjustment mode may be gradually reduced. For example, the luminance adjustment unit 31 may gradually reduce the luminance adjustment effect by the first luminance adjustment mode by reducing the degree of luminance adjustment as the frame is progressed.

Further, the mode switching in the above-described luminance adjustment processing may be optionally enabled or disabled depending on the settings.

In addition, in the above-described luminance adjustment processing, an example has been described in which the luminance is reduced, but the color of the high luminance region may be replaced with a low luminance color. Further, the reduction in luminance and the replacement of the color of the high luminance region can be selected by the setting.

In addition, the medical observation device may be configured to be suspended from the ceiling of the installation site.

In addition, an example of the microscopic system for surgery has been described in the above-described embodiment, the structure related to the luminance adjustment described above may be applied to a rigid or flexible endoscope apparatus including an imaging unit.

Further, the display device 4 may be configured so that backlight luminance can be adjusted for each display region. Here, the display device 4 may be configured to adjust the backlight luminance for each display region according to the luminance adjustment by the luminance adjustment unit 31.

As described above, the present disclosure can include various embodiments and the like without departing from the technical idea described in claims.

As described above, the image processing apparatus and the medical observation system according to the present disclosure are useful for flexibly adjusting the luminance for the high luminance region in the image.

According to the present disclosure, there is an effect that the luminance adjustment can be flexibly performed on the high luminance region in the image.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising
circuitry configured to:
set a luminance adjustment mode to one of a first luminance adjustment mode that performs luminance adjustment with preset sensitivity and a second luminance adjustment mode that has sensitivity of the luminance adjustment lower than the sensitivity of the first luminance adjustment mode and suppresses luminance of a high luminance region based on an observation state of an imager configured to capture a target;
perform the luminance adjustment in the set luminance adjustment mode,
detect presence or absence of a change in an imaging field of view by the imager; and
switch the luminance adjustment mode to one of the first luminance adjustment mode and the second luminance adjustment mode based on the detection result,
wherein in the second luminance adjustment mode, the imager is configured to:
measure the image captured by the imager to calculate luminance for each preset pixel region,
compare the calculated luminance with a preset first threshold value to temporarily extract the high luminance region,
set a second threshold value depending on a size of a temporarily extracted pixel region, and
compare the calculated luminance with the second threshold value to extract the high luminance region.

2. The image processing apparatus according to claim 1, wherein the circuitry is configured to generate an image subjected to the luminance adjustment.

3. The image processing apparatus according to claim 1, wherein the second threshold value decreases as the size of the temporarily extracted pixel region increases.

4. The image processing apparatus according to claim 1, wherein in the extraction of the high luminance region, a size of the pixel region in the image captured by the imager is partially different.

5. The image processing apparatus according to claim 1, wherein the imager is included in a microscope and is configured to capture a magnified image of the observation target.

6. The image processing apparatus according to claim 1, wherein the luminance adjustment with the preset sensitivity is reducing the luminance at a preset ratio.

7. A medical observation system comprising:
an imager configured to capture a target; and
circuitry configured to
set a luminance adjustment mode to one of a first luminance adjustment mode that performs luminance adjustment with preset sensitivity and a second luminance adjustment mode that has sensitivity of the luminance adjustment lower than the sensitivity of the first luminance adjustment mode and suppresses luminance of a high luminance region based on an observation state of the imager,
perform the luminance adjustment in the set luminance adjustment mode,
detect presence or absence of a change in an imaging field of view by the imager; and switch the luminance adjustment mode to one of the first luminance adjustment mode and the second luminance adjustment mode based on the detection result, wherein in the second luminance adjustment mode, the imager is configured to:

measure the image captured by the imager to calculate luminance for each preset pixel region, compare the calculated luminance with a preset first threshold value to temporarily extract the high luminance region, set a second threshold value depending on a size of a temporarily extracted pixel region, and compare the calculated luminance with the second threshold value to extract the high luminance region.

8. The medical observation system according to claim 7, wherein the circuitry is configured to generate an image subjected to the luminance adjustment.

9. The medical observation system according to claim 7, wherein the second threshold value decreases as the size of the temporarily extracted pixel region increases.

10. The medical observation system according to claim 7, wherein in the extraction of the high luminance region, a size of the pixel region in the image captured by the imager is partially different.

11. The medical observation system according to claim 7, wherein the imager is included in a microscope and is configured to capture a magnified image of the observation target.

* * * * *